United States Patent
Yu et al.

(10) Patent No.: US 11,216,619 B2
(45) Date of Patent: Jan. 4, 2022

(54) FEATURE REWEIGHTING IN TEXT CLASSIFIER GENERATION USING UNLABELED DATA

(71) Applicant: International Business Machines Corporation, Armonk, NY (US)

(72) Inventors: Yang Yu, Acton, MA (US); Haode Qi, Cambridge, MA (US); Haoyu Wang, Somerville, MA (US); Ming Tan, Malden, MA (US); Navneet N. Rao, Arlington, MA (US); Saloni Potdar, Arlington, MA (US); Robert Leslie Yates, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 4 days.

(21) Appl. No.: 16/860,565

(22) Filed: Apr. 28, 2020

(65) Prior Publication Data
US 2021/0334468 A1 Oct. 28, 2021

(51) Int. Cl.
*G06F 40/30* (2020.01)
*G06N 5/04* (2006.01)
*G06N 20/00* (2019.01)

(52) U.S. Cl.
CPC ........... *G06F 40/30* (2020.01); *G06N 5/04* (2013.01); *G06N 20/00* (2019.01)

(58) Field of Classification Search
None
See application file for complete search history.

(56) References Cited

U.S. PATENT DOCUMENTS

| 7,707,129 | B2 | 4/2010 | Zhuang et al. |
| 8,103,671 | B2 | 1/2012 | Gupta et al. |
| 8,838,433 | B2 | 9/2014 | Axelrod et al. |
| 10,628,529 | B2 * | 4/2020 | Zhelezniak ........... G06F 40/216 |
| 10,635,750 | B1 * | 4/2020 | Epstein ................... G06F 40/30 |

(Continued)

OTHER PUBLICATIONS

Banasik, John et al., "Sample selection bias in credit scoring models", International Conference on Credit Risk Modeling and Decisioning, Philadelphia, PA, May 2002, 22 pages.

(Continued)

*Primary Examiner* — Stella L. Woo
(74) *Attorney, Agent, or Firm* — Stephen R. Tkacs; Stephen J. Walder, Jr.; Brian Welle (57) ABSTRACT

A mechanism is provided to implement a text classifier training augmentation mechanism for incorporating unlabeled data into the generation of a text classifier. For each term of a plurality of terms in each document of a plurality of documents in a set of unlabeled data, a term frequency value is determined. The term is normalized by dividing the term frequency value by a total number of terms in the document. An inverse document frequency (idf) value is determined for each term based on the term frequency value. A subset of terms is filtered from the plurality of terms based the determined idf values. The idf values for the remaining terms are transformed into feature weights. Terms from a set of labeled data are re-weighted based on the feature weights determined from the set of unlabeled data. The text classifier is then generated using the re-weighted labeled data.

20 Claims, 6 Drawing Sheets

(56) References Cited

U.S. PATENT DOCUMENTS

| | | | |
|---|---|---|---|
| 2013/0254153 A1* | 9/2013 | Marcheret | G06N 7/00 |
| | | | 706/59 |
| 2016/0232630 A1* | 8/2016 | Admon | G06F 16/345 |
| 2016/0253597 A1 | 9/2016 | Bhatt et al. | |
| 2019/0347327 A1* | 11/2019 | Patil | G06N 3/084 |
| 2021/0142791 A1* | 5/2021 | Penta | G10L 15/063 |
| 2021/0174798 A1* | 6/2021 | Wu | G10L 15/22 |

OTHER PUBLICATIONS

Blum, Avrim et al., "Combining Labeled and Unlabeled Data with Co-Training", OLT98: The 11th Annual Conference on Computational Learning Theory, Madison Wisconsin USA Jul. 1998, 10 pages.

Chawla, Nitesh V. et al., "Learning From Labeled And Unlabeled Data: An Empirical Study Across Techniques And Domains", Journal of Artificial Intelligence Research 23, Mar. 2005, 36 pages.

Devlin, Jacob et al., "BERT: Pre-training of Deep Bidirectional Transformers for Language Understanding", https://arxiv.org/pdf/1810.04805.pdf, published May 21, 2019, 16 pages.

Huang, Jiayuan et al., "Correcting Sample Selection Bias by Unlabeled Data", Proceedings of the 19th Int. Conf. on Neural Information Processing Systems (NIPS'06), MIT Press, Cambridge, MA, USA, 8 Pages.

Kato, Masahiro et al., "Learning From Positive and Unlabeled Data With a Selection Bias", published as a conference paper at the Seventh Int. Conf. on Learning Representations (ICLR '19), May 6-9, 2019, 17 pages.

Konyushkova, Ksenia et al., "Learning Active Learning from Data", NIPS 2017, Thirty-first Conference on Neural Information Processing Systems, Dec. 2017, 11 pages.

Zhang, Tong et al., "A probability analysis on the value of unlabeled data for classification problems", Proceedings of the Seventeenth International Conference on Machine Learning (ICML 2000), Stanford University, Stanford, CA, USA, Jun. 29-Jul. 2, 2000, 8 pages.

Zhang, Yuan et al., "PAWS: Paraphrase Adversaries from Word Scrambling", Proceedings of NAACL-HLT 2019, Minneapolis, Minnesota, Jun. 2-Jun. 7, 2019, 11 pages.

Zhu, Xiaojin et al., "Learning from labeled and unlabeled data with label propagation", Technical Report CMU-CALD-02-107, Carnegie Mellon University, Jun. 2002, 19 pages.

* cited by examiner

|  | Labeled Data | | |
|---|---|---|---|
|  | 1 | 2 | 3 |
| 4 | 0.2 | 0.6 | 0.2 |
| 5 | 0.4 | 0.2 | 0.4 |
| 6 | 0.2 | 0.6 | 0.2 |
| Weighted Sum | 0.8 | 1.4 | 0.8 |
| Normalized Sample Reweight | 0.267 | 0.467 | 0.267 |

Unlabeled Data (406), Weighted Sum (408), Normalized Sample Reweight (410), 402, 404, 412: 1

FEATURE REWEIGHTING IN TEXT CLASSIFIER GENERATION USING UNLABELED DATA

BACKGROUND

The present application relates generally to an improved data processing apparatus and method and more specifically to mechanisms for feature reweighting in text classifier generation using unlabeled data.

The process of training a machine learning (ML) model involves providing an ML algorithm (that is, the learning algorithm) with training data to learn from. The term "ML model" refers to the model artifact that is created by the training process. The training data must contain the correct answer, which is known as a target or target attribute. The learning algorithm finds patterns in the training data that map the input data attributes to the target (the answer that you want to predict), and it outputs an ML model that captures these patterns.

In Bayesian statistics, a "hyperparameter" is a parameter of a prior distribution; the term is used to distinguish them from parameters of the model for the underlying system under analysis. For example, if one is using a beta distribution to model the distribution of the parameter p of a Bernoulli distribution, then: p is a parameter of the underlying system (Bernoulli distribution), and α and β are parameters of the prior distribution (beta distribution), hence hyperparameters.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided to implement a text classifier training augmentation mechanism for incorporating unlabeled data in addition to labeled data into the generation of a text classifier. The illustrative embodiment determines a term frequency value for each term of a plurality of terms in each document of a plurality of documents in a set of unlabeled data. The illustrative embodiment normalizes the term by dividing the term frequency value by a total number of terms in the document. The illustrative embodiment determines an inverse document frequency (idf) value for each term in the plurality of terms based on the term frequency value. The illustrative embodiment filters a subset of terms from the plurality of terms based the determined idf values. The illustrative embodiment transforms the idf values for the remaining terms into feature weights. The illustrative embodiment re-weights terms from a set of labeled data based on the feature weights determined from the set of unlabeled data. The illustrative embodiment generates the text classifier using the re-weighted labeled data.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Most machine learning mechanisms, such as neural nets, support vector machine (SVM), decision trees, or the like, which are utilized for text classification in order to generate models for use by conversational agents, attempt to minimize errors over labeled data examples by assuming labeled data examples are representative for a real usage. However, the labeling process that produces the labeled data may be associated with a selection bias, because the distributions of data points in labeled data sets is different from that in unlabeled data sets. Further, the language from which the labeled data is drawn and thus the model is generated may be different from a language of real-time user inputs on which the model acts. For example, if the labeled data is for a holiday season and the machine learning mechanisms generates a model based on this labeled data, the using that same model during the summer may cause confusion and errors in text classification. That is, real time utterance or language usage drifts over the time, for example, seasonal patterns, year to year, or the like.

In order to address the deficiencies of current machine learning mechanisms that are utilized to train a text classifier for use by conversational agents, i.e. any dialogue system that not only conducts natural language processing but also responds automatically using human language. Conversational agents are used in many enterprises that interact with customers, such as decision support systems, customer support agents, informational chatbots for marketing, or the like. These conversational agents represent the practical implementation of computational linguistics, usually employed as chatbots over the internet or as portable device assistants. Thus, the illustrative embodiments provide mechanisms that incorporate unlabeled data in addition to the labeled data, so as to improve text classification tasks within such text classifiers. In a first embodiment, the mechanisms utilize unlabeled data to adjust feature weighting used to weight features of labeled data during training of the text classifier. In a second embodiment, the mechanisms utilize unlabeled data to adjust sample weighting used to identify which samples utilized during the generation of the text classifier. In a third embodiment, the mechanisms perform data augmentation such that unlabeled data, which is used to adjust feature weights of the labeled data and identify which samples are more important, is made available to the text classifier in order to provide for consistent predictions of paraphrased unlabeled data both in the training of the text classifier and during text classification enforcement. Thus, the illustrative embodiments provide for minimizing errors over text classification drawn from the same underlying distribution. That is, the unlabeled data allows for estimating this distribution more accurately and to reweight information and knowledge in the text classifier accordingly.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 1:
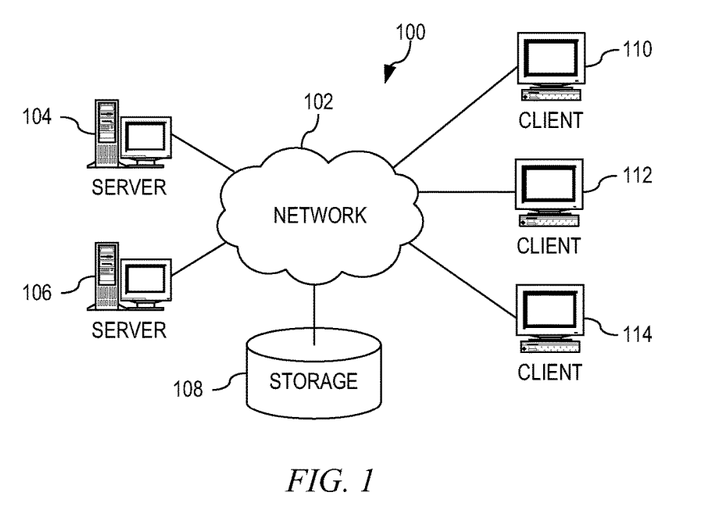
FIG. 1 is an example diagram of a distributed data processing system in which aspects of the illustrative embodiments may be implemented.
Figure 2:
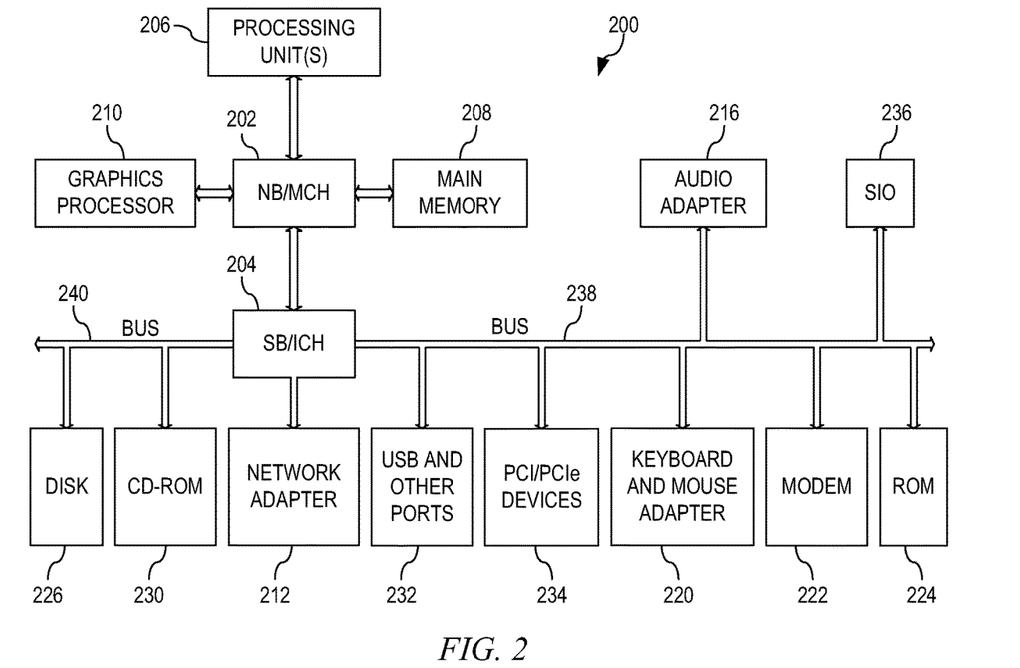
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a text classifier training augmentation mechanism. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates feature reweighting in generating a text classifier using unlabeled data.

As noted above, the mechanisms of the illustrative embodiments utilize specifically configured computing devices, or data processing systems, to perform the operations for implementing a text classifier training augmentation mechanism that reweights features used in generating a text classifier using unlabeled data. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to a text classifier training augmentation mechanism and reweighting features used in generating a text classifier using unlabeled data.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
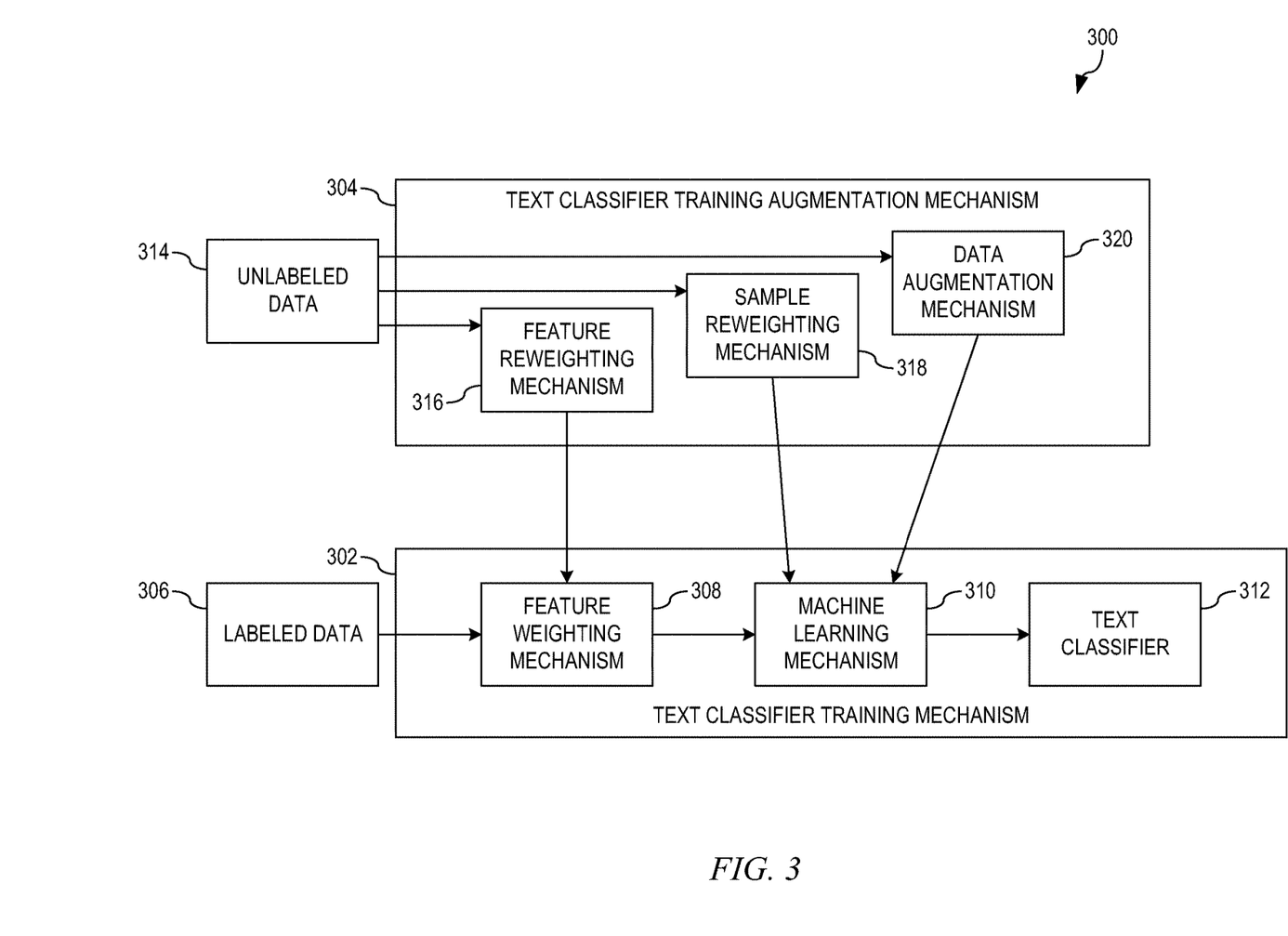
FIG. 3 depicts one example of a functional block diagram of a data processing system that comprises a text classifier training mechanism and a text classifier training augmentation mechanism for reweighting the training of a text classifier using unlabeled data in accordance with an illustrative embodiment.

FIG. 3 depicts one example of a functional block diagram of a data processing system that comprises a text classifier training mechanism and a text classifier training augmentation mechanism for reweighting the training of a text classifier using unlabeled data in accordance with an illustrative embodiment. Data processing system 300 comprises text classifier training mechanism 302 and a text classifier training augmentation mechanism 304.

In generating a text classifier for use by a conversational agent, text classifier training mechanism 302 utilizes labeled data 306, which is training data extracted from real-time or stored conversational agent chat logs. Feature weighting mechanism 308 weights the terms in the extracted training data and machine learning mechanism 310 utilizes labeled data 306 as weighted by feature weighting mechanism 308 to generate a text classifier 312 for use by the conversational agent. However, as stated previously, the labeling process that produces labeled data 306 may be associated with a selection bias, because the distributions of data points in labeled data sets is different from that in unlabeled data sets. Further, the language from which labeled data 306 is drawn and thus text classifier 312 generated using labeled data 306 may be different from a language of real-time user inputs on which the model acts.

In order to address these deficiencies, the illustrative embodiment provides text classifier training augmentation mechanism 304. Text classifier training augmentation mechanism 304 incorporates unlabeled data 314 in addition to the labeled data 306, so as to improve text classification tasks within text classifier 312. Accordingly, text classifier training augmentation mechanism 304 comprises feature reweighting mechanism 316, sample reweighting mechanism 318, and data augmentation mechanism 320. Feature reweighting mechanism 316 adjusts the features weight utilized by feature weighting mechanism 308 during training according to unlabeled data 314. In order to adjust the features weight utilized by feature weighting mechanism 308, feature reweighting mechanism 316 learns term frequency-inverse document frequency (tf-idf) from unlabeled data, i.e. data from unlabeled real-world chat logs. Tf-idf weight is a weight used in information retrieval and text mining. The tf-idf weight is a statistical measure used to evaluate how important a word is to a document in a collection or corpus. The importance increases proportionally to the number of times a word appears in the document but is offset by the frequency of the word in the corpus. Thus, feature reweighting mechanism 316 utilizes the variations of the tf-idf weighting scheme in scoring and ranking a document's relevance given a user query.

Thus, feature reweighting mechanism 316 takes each unlabeled real-world chat log in a set of unlabeled real-world chat logs as a document and determines a term frequency value, i.e. how frequently a term occurs in a document. Since every document is different in length, a particular term may appear many more times in long documents than shorter documents. Thus, feature reweighting mechanism 316 may divide the determined term frequency value by the document length (aka. the total number of terms in the document) as a way of normalization. Feature reweighting mechanism 316 then determines an inverse document frequency value, i.e. how important a term is, using the determined term frequency value. For example, in the chatbot scenario, a document is a training example. Given a hypothetical dataset with 3 document examples:

Hello John
Hi Kacy
Good bye John, John and using the following equation:

$$IDF(t) = \log\_e(\frac{\text{Total number of documents}}{\text{Number of documents with term } t}).$$

feature reweighting mechanism 316 determines the normalized idf value for John as log_e (3 total document examples/2 document examples with John)=log_e (3/2). For document example 1, feature reweighting mechanism 316 determines the term frequency (tf) of John to be 1. Therefore, tfidf of John given example 1=1*log(3/2). For document example 3, feature reweighting mechanism 316 determined the term frequency of John to be 2. Thus, the tfidf of John given example 3=2*log(3/2). While computing the term frequency, all terms are considered equally important. However, some certain terms, such as "s," "of," "that," or the like, may appear a lot of times but have little importance. Thus, feature reweighting mechanism 316 weighs down frequent terms while scaling up the rare terms, by computing the idf value for the term using the following equation:

$$IDF(t) = \log\_e(\frac{\text{Total number of documents}}{\text{Number of documents with term } t}).$$

Thus, low idf values are indicative of stop words, frequent words, or the like, and high idf values are indicative of rare words, misspelled words, or the like. Thus, for unlabeled data 314, feature reweighting mechanism 316 uses the idf values associated with each term in unlabeled data 314 to filter stop words, frequent words, rare words, misspelling words, or the like, and transforms the idf values for the remaining terms into feature weights. Feature reweighting mechanism 316 then uses the determined feature weights for the remaining terms in unlabeled data 314 to re-weight the weights of the terms as applied by feature weighting mechanism 308 in weighting the terms of labeled data 306, which in turn causes feature weighting mechanism 308 to weights the terms in extracted training data differently and, in turn causes machine learning mechanism 310 to generate a text classifier 312 for use by the conversational agent based on re-weighted terms as weighted and re-weighted by feature weighting mechanism 308 and feature reweighting mechanism 316.

In addition to adjusting the weights of the terms that are utilized to generate text classifier 312, the illustrative embodiments also provide for adjusting the training sample sentence weights utilized by machine learning mechanism 310 during the generation of text classifier 312. If a real-world distribution is to be provided when generating text classifier 312, then sentences from labeled data 306 should be weighted by the sentence's probability according to this real-word distribution, i.e. unlabeled data 314 which are unlabeled real-world chat logs. In order to weight the sentences from labeled data 306 according to unlabeled data 314, sample reweighting mechanism 318 uses a cutting-edge contextualized embedding framework, such as BERT, to generate sentence representation, i.e. part-of-speech tagging, syntactic parsing, semantic parsing, or the like, for unlabeled data 314.

Figure 4:
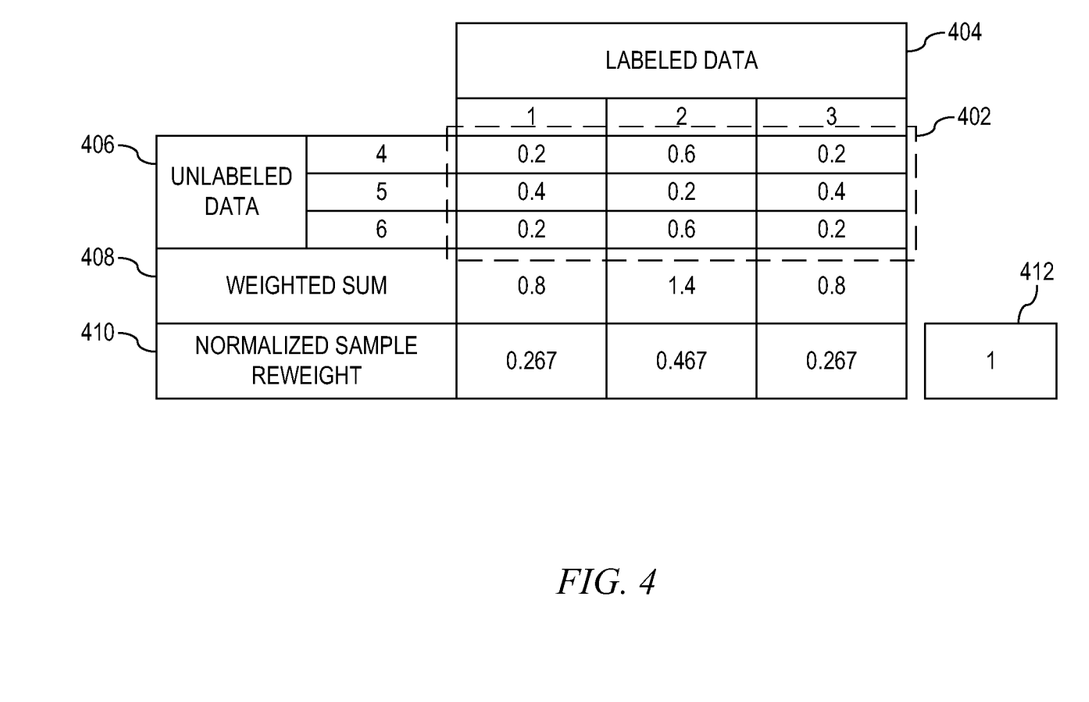
FIG. 4 illustrates one example of sample reweighting determination made by a sample reweighting mechanism in accordance with an illustrative embodiment.

The remainder of the sample reweighting will be described with regard to FIG. 4 which illustrates one example of sample reweighting determination made by sample reweighting mechanism 318 in accordance with an illustrative embodiment. Utilizing the generated sentence representations for unlabeled data 314, sample reweighting mechanism 318 computes a cosine similarity between the sentence representation of sentences in labeled data 306 and sentence representation of unlabeled data 314. Cosine similarity is a metric used to measure how similar the documents/sentences are irrespective of their size thereby mitigating data sparsity and incorporating general knowledge background. Dashed box 402 shows the cosine similarities determined between labeled data 404, i.e. samples 1, 2, and 3, and unlabeled data 406, i.e. samples 4, 5, and 6. Sample reweighting mechanism 318 then determines a weighted sum 408 of the similarities for each labeled data training sample. Sample reweighting mechanism 318 then normalizes the sample reweights 410 over all training samples such that the sum of the normalized sample reweights is equal to 1, as illustrated by box 412. Sample reweighting mechanism 318 then submits these normalized sample reweights to machine learning mechanism 310 so that machine learning mechanism 310 utilizing these normalized sample reweights to generate text classifier 312. Machine learning mechanism 310 applies each reweight as an additional training objective such that:

Loss(original example)+alpha*Loss(weighted example)

where alpha is a hyperparameter that is user configurable. That is, during training, a machine learning model is trying to learn from examples by penalizing misclassifications. Machine learning mechanism 310 determines the penalty using a loss function, loss (original example). Now, on top of that, machine learning mechanism 310 adds an additional loss, loss(weighted example)=learned-weight*loss(original-example). The only change is an additional learned-weight which is derived as described previously. It is noted that if a training sample has weighted sum less than a predetermined threshold, sample reweighting mechanism 318 provides an indication that a more fundamental problem exists with the sample and should be updated.

In addition to reweighting the samples of labeled data 304 that machine learning mechanism 310 utilizes to generate text classifier 312, the illustrative embodiments also provide the ability for machine learning mechanism 310 to use unlabeled data 314 in generating text classifier 312 by enforce model consistency predictions among paraphrased unlabeled data 314. Currently, the training process used in generating a text classifier 312 does not see the actual unlabeled utterances in unlabeled data 314 used in the reweighting performed by sample reweighting mechanism 318. Thus, the language variety in unlabeled data 314 is not learned by machine learning mechanism 310 and thus, the text classifier 312 generated by machine learning mechanism 310 may not to learn well on some labeled classes (e.g. due to data sparsity) and so the generated text classifier 312 model may be underfit.

Thus, data augmentation mechanism 320 utilizes a cutting-edge contextualized embedding framework, such as BERT, that understands a variety of languages variety to generate sentence representation, i.e. part-of-speech tagging, syntactic parsing, semantic parsing, or the like, for unlabeled data 314 and therefore, reliably augment unlabeled data 314 while keeping the same semantics. That is, data augmentation mechanism 320 augmenting unlabeled data 314 can, for example, translate unlabeled data 314 to another language then translate the translated unlabeled data back thereby adding more language variety in unlabeled data 314. Data augmentation mechanism 320 then uses a classifier to provide a prediction distribution between unlabeled data samples directly from unlabeled data 314 and augmented unlabeled data samples. Data augmentation mechanism 320 then performs an inter-sample agreement check to identify a consistency loss value between the unlabeled data samples and the augmented unlabeled data samples. Data augmentation mechanism 320 then provides the unlabeled data samples from unlabeled data 314 as well as the augmented unlabeled data samples and the consistency loss value to machine learning mechanism 310 so that machine learning mechanism 310, in addition to using labeled data 306, uses unlabeled data 314 and the augmented unlabeled data generated by data augmentation mechanism 320 in learning and thus training so as to generate a text classifier 312 that is not underfit. Machine learning mechanism 310 applies unlabeled data 314 and the augmented unlabeled data such that:

Loss(original example)+alpha*Loss(weighted example)+gamma*Consistency_loss(unlabeled data)

where alpha and gamma are hyperparameters that are user configurable.

Again, during training, a machine learning model is trying to learn from examples by penalizing misclassifications. Machine learning mechanism 310 determines the penalty using a loss function, loss (original example). Now, on top of that, machine learning mechanism 310 adds an additional loss, loss(weighted example)=learned-weight*loss(original-example). The only change is an additional learned-weight which is derived as described previously. In one example, machine learning mechanism 310 may determine the consistency loss by comparing the unlabeled data that is used to generate the sentence vs the actual generated sentence. Generally speaking, consistency loss is an inverse to the similarity between a generated sentences and its associated unlabeled sentence data. However, since there are no established formulas to calculate consistence loss, the illustrative embodiments recognize that any function that could describe such a relationship may be used to determine consistency loss. Thus, the illustrative embodiments provide mechanisms that incorporate unlabeled data in addition to the labeled data, so as to improve text classification tasks within such text classifiers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
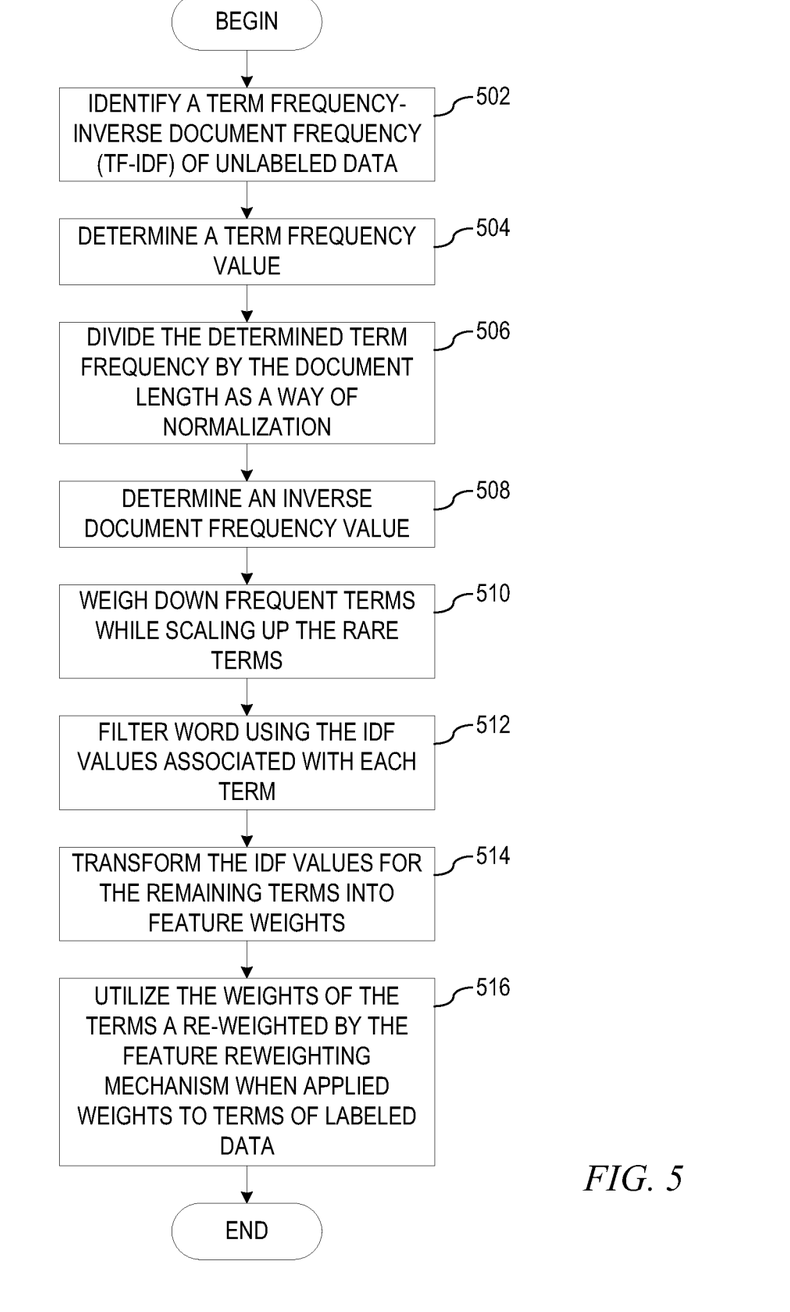
FIG. 5 depicts one example of a flowchart of the operation performed by a text classifier training augmentation mechanism in reweighting features utilized by a feature weighting mechanism of a text classifier training mechanism in accordance with an illustrative embodiment.

FIG. 5 depicts one example of a flowchart of the operation performed by a text classifier training augmentation mechanism in reweighting features utilized by a feature weighting mechanism of a text classifier training mechanism in accordance with an illustrative embodiment. As the operation begins, a feature reweighting mechanism of the text classifier training augmentation mechanism identifies a term frequency-inverse document frequency (tf-idf) of unlabeled data, i.e. data from unlabeled real-world chat logs (step 502). Tf-idf weight is a weight used in information retrieval and text mining. The tf-idf weight is a statistical measure used to evaluate how important a word is to a document in a collection or corpus. The importance increases proportionally to the number of times a word appears in the document but is offset by the frequency of the word in the corpus. Thus, feature reweighting mechanism 316 utilizes the variations of the tf-idf weighting scheme in scoring and ranking a document's relevance given a user query.

To identify a term frequency-inverse document frequency (tf-idf) of unlabeled data the feature in step 502, the feature reweighting mechanism determines a term frequency value, i.e. how frequently a term occurs in a document in the unlabeled data (step 504). The illustrative embodiments consider a document to be unlabeled real-world chat log in a set of unlabeled real-world chat logs. Since every document is different in length, a particular term may appear many more times in long documents than shorter documents. Thus, the feature reweighting mechanism divides the determined term frequency by the document length (aka. the total number of terms in the document) as a way of normalization (step 506). The feature reweighting mechanism then determines an inverse document frequency value (step 508), i.e. how important a term is. While computing the term frequency, all terms are considered equally important. However, some certain terms, such as "s," "of," "that," or the like, may appear a lot of times but have little importance. Therefore, the feature reweighting mechanism weighs down frequent terms while scaling up the rare terms (step 510), using the following formula:

$$IDF(t) = \log\_e(\frac{\text{Total number of documents}}{\text{Number of documents with term } t}).$$

In the illustrative embodiments, low idf values are indicative of stop words, frequent words, or the like, and high idf values are indicative of rare words, misspelled words, or the like. Thus, for the unlabeled data, the feature reweighting mechanism filter stop words, frequent words, rare words, misspelling words, or the like, using the idf values associated with each term in the unlabeled data (step 512). The feature reweighting mechanism then transforms the idf values for the remaining terms into feature weights (step 514). The feature weighting mechanism utilizes the weights of the terms a re-weighted by the feature reweighting mechanism when applied weights to terms of labeled data (step 516). This, in turn, causes feature weighting mechanism to weight the terms in extracted training data differently and causes a machine learning mechanism of the text classifier training mechanism to generate a text classifier for use by the conversational agent based on re-weighted terms as weighted and re-weighted by the feature weighting mechanism and the feature reweighting mechanism. The operation ends thereafter.

Figure 6:
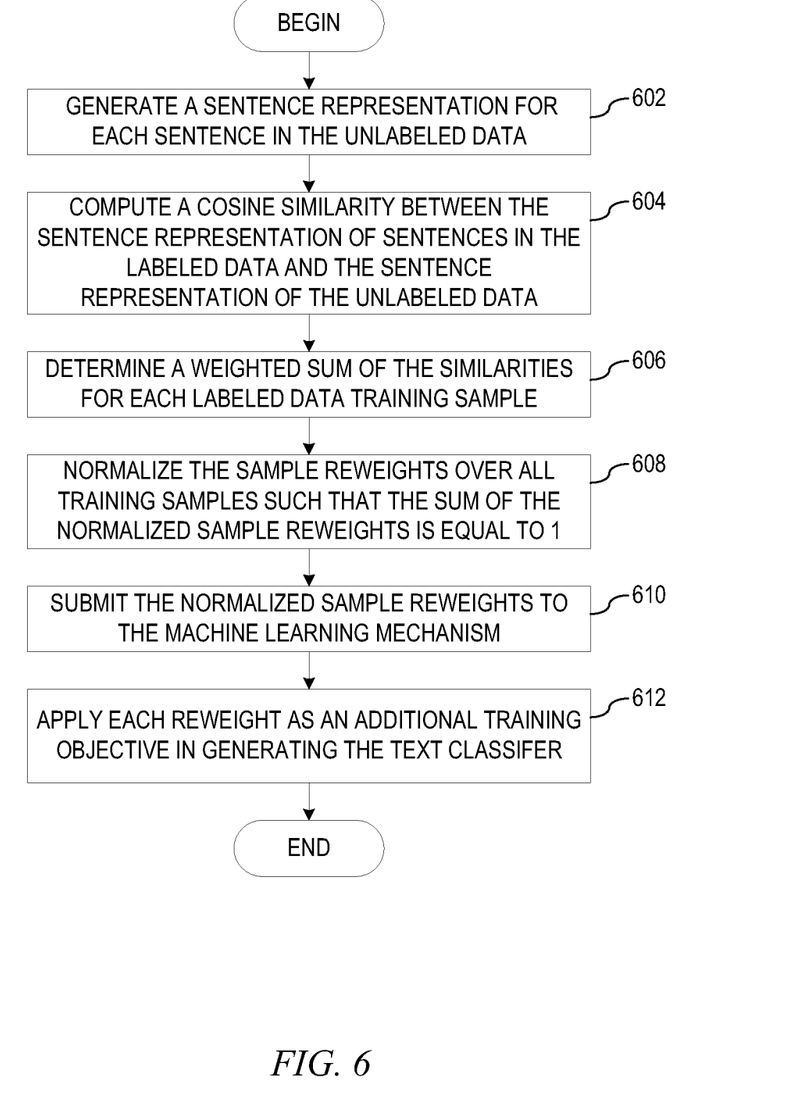
FIG. 6 depicts one example of a flowchart of the operation performed by a text classifier training augmentation mechanism in adjusting the training sample sentence weights utilized by a machine learning mechanism of a text classifier training mechanism in accordance with an illustrative embodiment.

FIG. 6 depicts one example of a flowchart of the operation performed by a text classifier training augmentation mechanism in adjusting the training sample sentence weights utilized by a machine learning mechanism of a text classifier training mechanism in accordance with an illustrative embodiment. As the operation begins, in order to weight the sentences from labeled data according to unlabeled data, sample reweighting mechanism of text classifier training augmentation mechanism uses a cutting-edge contextualized embedding framework, such as BERT, to generate sentence representation, i.e. part-of-speech tagging, syntactic parsing, semantic parsing, or the like, for each sentence in the unlabeled data (step 602). Utilizing the generated sentence representations for the unlabeled data, the sample reweighting mechanism computes a cosine similarity between the sentence representation of sentences in the labeled data and the sentence representation of the unlabeled data (step 604). Cosine similarity is a metric used to measure how similar the documents/sentences are irrespective of their size thereby mitigating data sparsity and incorporating general knowledge background. The sample reweighting mechanism then determines a weighted sum of the similarities for each labeled data training sample (step 606). The sample reweighting mechanism normalizes the sample reweights over all training samples such that the sum of the normalized sample reweights is equal to 1 (step 608). The sample reweighting mechanism submits the normalized sample reweights to the machine learning mechanism (step 610) so that machine learning mechanism utilizes these normalized sample reweights to generate the text classifier. The machine learning mechanism applies each reweight as an additional training objective in generating the text classifier (step 612) such that:

Loss(original example)+alpha*Loss(weighted example)

where alpha is a hyperparameter that is user configurable. That is, during training, a machine learning model is trying to learn from examples by penalizing misclassifications. Machine learning mechanism 310 determines the penalty using a loss function, loss (original example). Now, on top of that, machine learning mechanism 310 adds an additional loss, loss(weighted example)=learned-weight*loss(original-example). The only change is an additional learned-weight which is derived as described previously. It is noted that if a training sample has weighted sum less than a predetermined threshold, the sample reweighting mechanism provides an indication that a more fundamental problem exists with the sample and should be updated. The operation ends thereafter.

Figure 7:
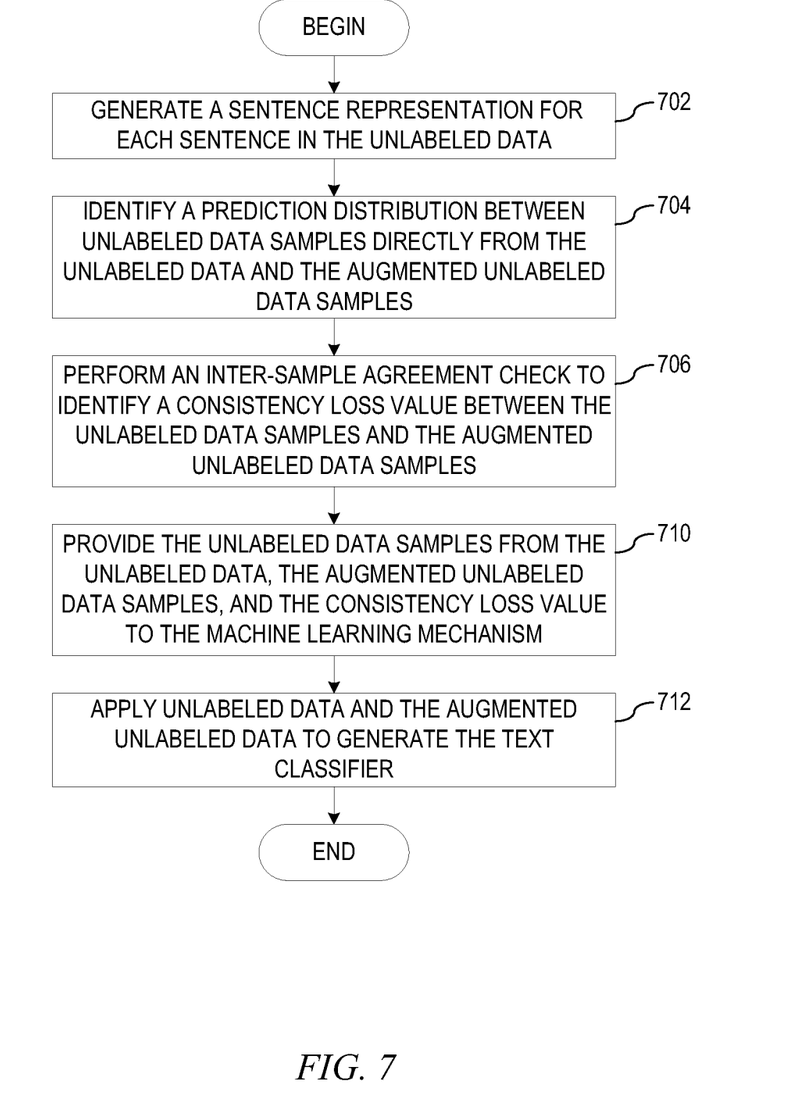
FIG. 7 depicts one example of a flowchart of the operation performed by a text classifier training augmentation mechanism in providing unlabeled data to a machine learning mechanism of a text classifier training mechanism for use in generating a text classifier in accordance with an illustrative embodiment.

FIG. 7 depicts one example of a flowchart of the operation performed by a text classifier training augmentation mechanism in providing unlabeled data to a machine learning mechanism of a text classifier training mechanism for use in generating a text classifier in accordance with an illustrative embodiment. As the operation begins, a data augmentation mechanism within the text classifier training augmentation mechanism utilizes a cutting-edge contextualized embedding framework, such as BERT, that understands a variety of languages variety to generate sentence representation, i.e. part-of-speech tagging, syntactic parsing, semantic parsing, or the like, for unlabeled data and therefore, reliably augment the unlabeled data while keeping the same semantics (step 702). The data augmentation mechanism then identifies a prediction distribution between unlabeled data samples directly from the unlabeled data and the augmented unlabeled data samples (step 704). The data augmentation mechanism performs an inter-sample agreement check to identify a consistency loss value between the unlabeled data samples and the augmented unlabeled data samples (step 706). The data augmentation mechanism provides the unlabeled data samples from the unlabeled data, the augmented unlabeled data samples, and the consistency loss value to the machine learning mechanism (step 708) so that the machine learning mechanism, in addition to using labeled data, uses the unlabeled data and the augmented unlabeled data generated by data augmentation mechanism in learning and thus, training so as to generate a text classifier that is not underfit. The machine learning mechanism applies unlabeled data and the augmented unlabeled data to generate the text classifier (step 710) such that:

Loss(original example)+alpha*Loss(weighted example)+gamma*Consistency_loss(unlabeled data)

where alpha and gamma are hyperparameters that are user configurable. Again, during training, a machine learning model is trying to learn from examples by penalizing misclassifications. Machine learning mechanism 310 determines the penalty using a loss function, loss (original example). Now, on top of that, machine learning mechanism 310 adds an additional loss, loss(weighted example) =learned-weight*loss(original-example). The only change is an additional learned-weight which is derived as described previously. In one example, machine learning mechanism 310 may determine the consistency loss by comparing the unlabeled data that is used to generate the sentence vs the actual generated sentence. Generally speaking, consistency loss is an inverse to the similarity between a generated sentences and its associated unlabeled sentence. However, since there are no established formulas to calculate consistence loss, the illustrative embodiments recognize that any function that could describe such a relationship may be used to determine consistency loss. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for incorporating unlabeled data in addition to the labeled data, so as to improve text classification tasks within such text classifiers. In a first embodiment, the mechanisms utilize unlabeled data to adjust feature weighting used to weight features of labeled data during training of the text classifier. In a second embodiment, the mechanisms utilize unlabeled data to adjust sample weighting used to identify which samples utilized during the generation of the text classifier. In a third embodiment, the mechanisms perform data augmentation such that unlabeled data, which is used to adjust feature weights of the labeled data and identify which samples are more important, is made available to the text classifier in order to provide for consistent predictions of paraphrased unlabeled data both in the training of the text classifier and during text classification enforcement. Thus, the illustrative embodiments provide for minimizing errors over text classification drawn from the same underlying distribution. That is, the unlabeled data allows for estimating this distribution more accurately and to reweight information and knowledge in the text classifier accordingly.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising at least one processor and at least one memory, wherein the at least one memory comprises instructions that are executed by the at least one processor to configure the at least one processor to implement a text classifier training augmentation mechanism for incorporating unlabeled data in addition to labeled data into the generation of a text classifier, the method comprising:

determining, by the text classifier training augmentation mechanism, an inverse document frequency (idf) value for each term in a plurality of terms in a set of unlabeled data;

re-weighting, by the text classifier training augmentation mechanism, terms from a set of labeled data based on the idf values for the plurality of terms in the set of unlabeled data;

generating, by the text classifier training augmentation mechanism, a set of normalized sample reweights based on a similarity between each sentence in the set of labeled data and each sentence in the set of unlabeled data;

generating, by the text classifier training augmentation mechanism, a set of augmented sentences based on the plurality of sentences in the set of unlabeled data;

performing, by the text classifier training augmentation mechanism, an inter-sample agreement check to identify a consistency loss value between the plurality of sentences in the set of unlabeled data and the set of augmented sentences; and generating, by a machine learning mechanism, the text classifier using the re-weighted labeled data, the set of normalized sample reweights, and the consistency loss value, wherein the machine learning mechanism generates the text classifier using the plurality of sentences in the set of unlabeled data, the set of augmented sentences from the set of unlabeled data, and the consistency loss value using the following loss function:

Loss(original example)+alpha*Loss(weighted example)+gamma*Consistency_loss(unlabeled samples)

where alpha and gamma are hyperparameters that are user configurable.

2. The method of claim 1, further comprising:
weighing down, by the text classifier training augmentation mechanism, frequent terms in the plurality of terms while scaling up rare terms in the plurality of terms by computing the idf value for the term using the following equation:

$$IDF(t) = \log\_e(\frac{\text{Total number of documents}}{\text{Number of documents with term } t}).$$

3. The method of claim 1, wherein generating the set of normalized sample reweights further comprises:
generating, by the text classifier training augmentation mechanism, a sentence representation for each sentence of a plurality of sentences in the set of unlabeled data;

computing, by the text classifier training augmentation mechanism, a cosine similarity between each sentence representation of a plurality of sentences in the set of labeled data and each sentence representation of the set of unlabeled data;

determining, by the text classifier training augmentation mechanism, a weighted sum of the similarities for each sentence in the set of labeled data; and normalizing, by the text classifier training augmentation mechanism, the weighted sums over all the plurality of sentences in the labeled data thereby producing the set of normalized sample reweights.

4. The method of claim 3, wherein the Loss(weighted example) is equal to a learned-weight multiplied by the Loss(original example).

5. The method of claim 1, wherein performing the inter-sample agreement check further comprises:
generating, by the text classifier training augmentation mechanism, a sentence representation for each sentence in the set of unlabeled data thereby generating the set of augmented sentences; and identifying, by the text classifier training augmentation mechanism, a prediction distribution between the plurality of sentences in the set of unlabeled data and the set of augmented sentences from the set of unlabeled data.

6. The method of claim 5, wherein the Consistency_loss is an inverse to a similarity between at least one generated sentence and at least one associated unlabeled sentence.

7. The method of claim 1, wherein determining the inverse document frequency (idf) value for each term in the plurality of terms comprises:
for each term of the plurality of terms in the set of unlabeled data, determining a term frequency value;

normalizing the term by dividing the term frequency value by a total number of terms in the document.

8. The method of claim 7, further comprising:
filtering a subset of terms from the plurality of terms based the determined idf values; and transforming the idf values for the remaining terms into feature weights.

9. A computer program product comprising a computer readable storage medium having a computer readable program stored therein, wherein the computer readable program, when executed on a data processing system, causes the data processing system to implement a text classifier training augmentation mechanism for incorporating unlabeled data in addition to labeled data into the generation of a text classifier, and further causes the data processing system to:

determine an inverse document frequency (idf) value for each term in a plurality of terms in a set of unlabeled data;

re-weight terms from a set of labeled data based on the idf values for the plurality of terms in the set of unlabeled data;

generate, by the text classifier training augmentation mechanism, a set of normalized sample reweights based on a similarity between each sentence in the set of labeled data and each sentence in the set of unlabeled data;

generate, by the text classifier training augmentation mechanism, a set of augmented sentences based on the plurality of sentences in the set of unlabeled data;

perform, by the text classifier training augmentation mechanism, an inter-sample agreement check to identify a consistency loss value between the plurality of sentences in the set of unlabeled data and the set of augmented sentences; and generate the text classifier using the re-weighted labeled data, the set of normalized sample reweights, and the consistency loss value, wherein the machine learning mechanism generates the text classifier using the plurality of sentences in the set of unlabeled data, the set of augmented sentences from the set of unlabeled data, and the consistency loss value using the following loss function:

Loss(original example)+alpha*Loss(weighted example)+gamma*Consistency_loss(unlabeled samples)

where alpha and gamma are hyperparameters that are user configurable.

10. The computer program product of claim 9, wherein the computer readable program further causes the data processing system to:

weigh down frequent terms in the plurality of terms while scaling up rare terms in the plurality of terms by computing the idf value for the term using the following equation:

$$IDF(t) = \log\_e(\frac{\text{Total number of documents}}{\text{Number of documents with term } t}).$$

11. The computer program product of claim 9, wherein generating the set of normalized sample reweights further comprises:

generating a sentence representation for each sentence of a plurality of sentences in the set of unlabeled data;

computing a cosine similarity between each sentence representation of a plurality of sentences in the set of labeled data and each sentence representation of the set of unlabeled data;

determining a weighted sum of the similarities for each sentence in the set of labeled data; and normalizing the weighted sums over all the plurality of sentences in the labeled data thereby producing the set of normalized sample reweights.

12. The computer program product of claim 11, wherein the Loss(weighted example) is equal to a learned-weight multiplied by the Loss(original example).

13. The computer program product of claim 9, wherein performing the inter-sample agreement check further comprises:

generating a sentence representation for each sentence in the set of unlabeled data thereby generating the set of augmented sentences; and identifying a prediction distribution between the plurality of sentences in the set of unlabeled data and the set of augmented sentences from the set of unlabeled data.

14. The computer program product of claim 13, wherein the Consistency_loss is an inverse to a similarity between at least one generated sentence and at least one associated unlabeled sentence.

15. An apparatus comprising:

at least one processor; and at least one memory coupled to the at least one processor, wherein the at least one memory comprises instructions which, when executed by the at least one processor, cause the at least one processor to implement a text classifier training augmentation mechanism for incorporating unlabeled data in addition to labeled data into the generation of a text classifier, and further cause the at least one processor to:

determine an inverse document frequency (idf) value for each term in a plurality of terms in a set of unlabeled data;

re-weight terms from a set of labeled data based on the idf values for the plurality of terms in the set of unlabeled data;

generate, by the text classifier training augmentation mechanism, a set of normalized sample reweights based on a similarity between each sentence in the set of labeled data and each sentence in the set of unlabeled data;

generate, by the text classifier training augmentation mechanism, a set of augmented sentences based on the plurality of sentences in the set of unlabeled data;

perform, by the text classifier training augmentation mechanism, an inter-sample agreement check to identify a consistency loss value between the plurality of sentences in the set of unlabeled data and the set of augmented sentences; and generate the text classifier using the re-weighted labeled data, the set of normalized sample reweights, and the consistency loss value, wherein the machine learning mechanism generates the text classifier using the plurality of sentences in the set of unlabeled data, the set of augmented sentences from the set of unlabeled data, and the consistency loss value using the following loss function:

Loss(original example)+alpha*Loss(weighted example)+gamma*Consistency_ loss(unlabeled samples)

where alpha and gamma are hyperparameters that are user configurable.

16. The apparatus of claim 15, wherein the instructions further cause the at least one processor to:

weigh down frequent terms in the plurality of terms while scaling up rare terms in the plurality of terms by computing the idf value for the term using the following equation:

$$IDF(t) = \log\_e(\frac{\text{Total number of documents}}{\text{Number of documents with term } t}).$$

17. The apparatus of claim 15, wherein generating the set of normalized sample reweights further comprises:

generating a sentence representation for each sentence in the set of unlabeled data;

computing a cosine similarity between each sentence representation of a plurality of sentences in the set of labeled data and each sentence representation of the set of unlabeled data;

determining a weighted sum of the similarities for each sentence in the set of labeled data; and normalizing the weighted sums over all the plurality of sentences in the labeled data thereby producing the set of normalized sample reweights.

18. The apparatus of claim 17, wherein the Loss(weighted example) is equal to a learned-weight multiplied by the Loss(original example).

19. The apparatus of claim 15, wherein performing the inter-sample agreement check further comprises:

generating a sentence representation for each sentence in the set of unlabeled data thereby generating the set of augmented sentences; and identifying a prediction distribution between the plurality of sentences in the set of unlabeled data and the set of augmented sentences from the set of unlabeled data.

20. The apparatus product of claim 19, wherein the Consistency_loss is an inverse to a similarity between at least one generated sentence and at least one associated unlabeled sentence.

* * * * *